Figure 3:
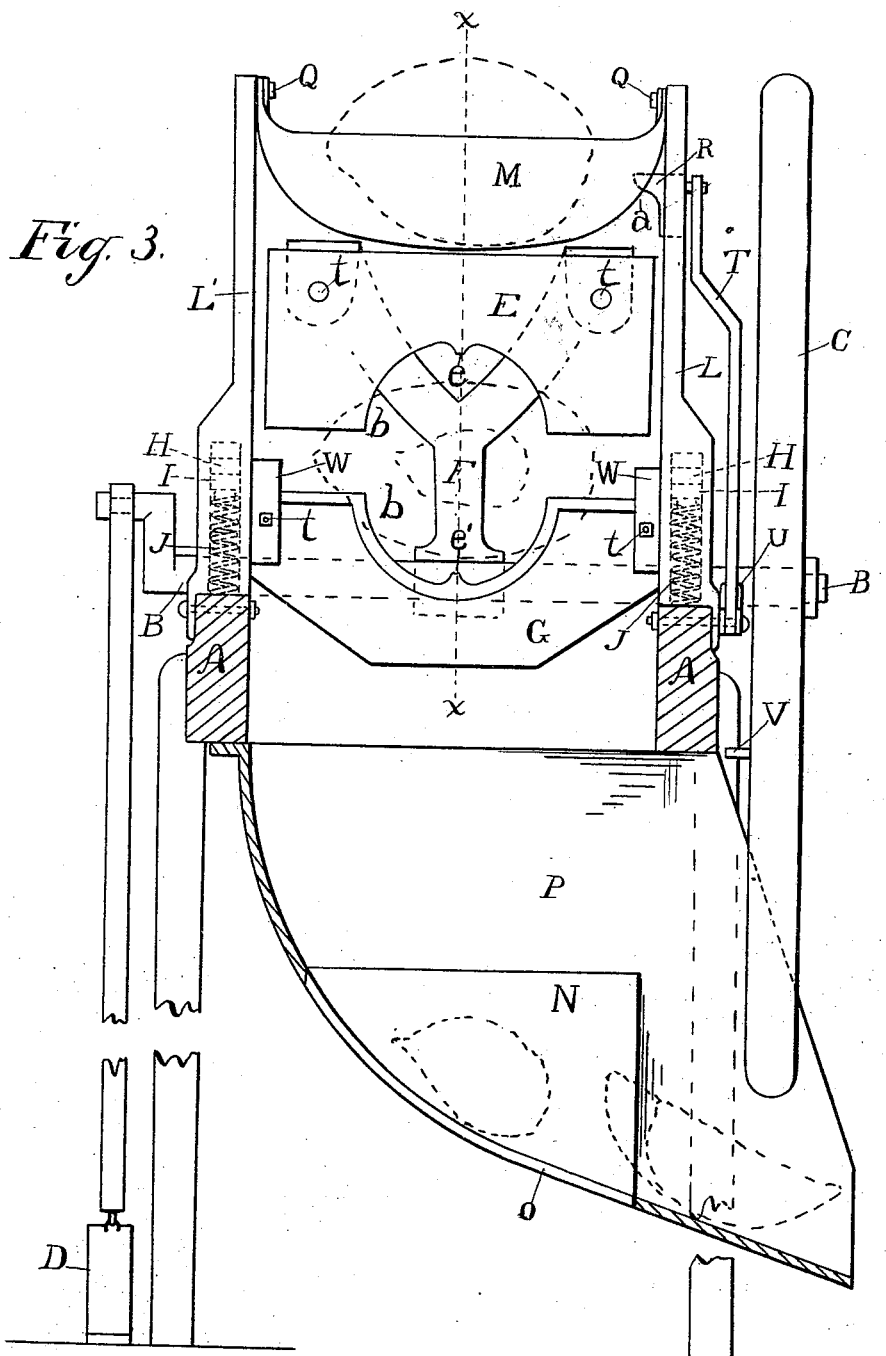

(No Model.) 3 Sheets—Sheet 1.
J. HARPS.
FRUIT PITTING MACHINE.
No. 464,128. Patented Dec. 1, 1891.
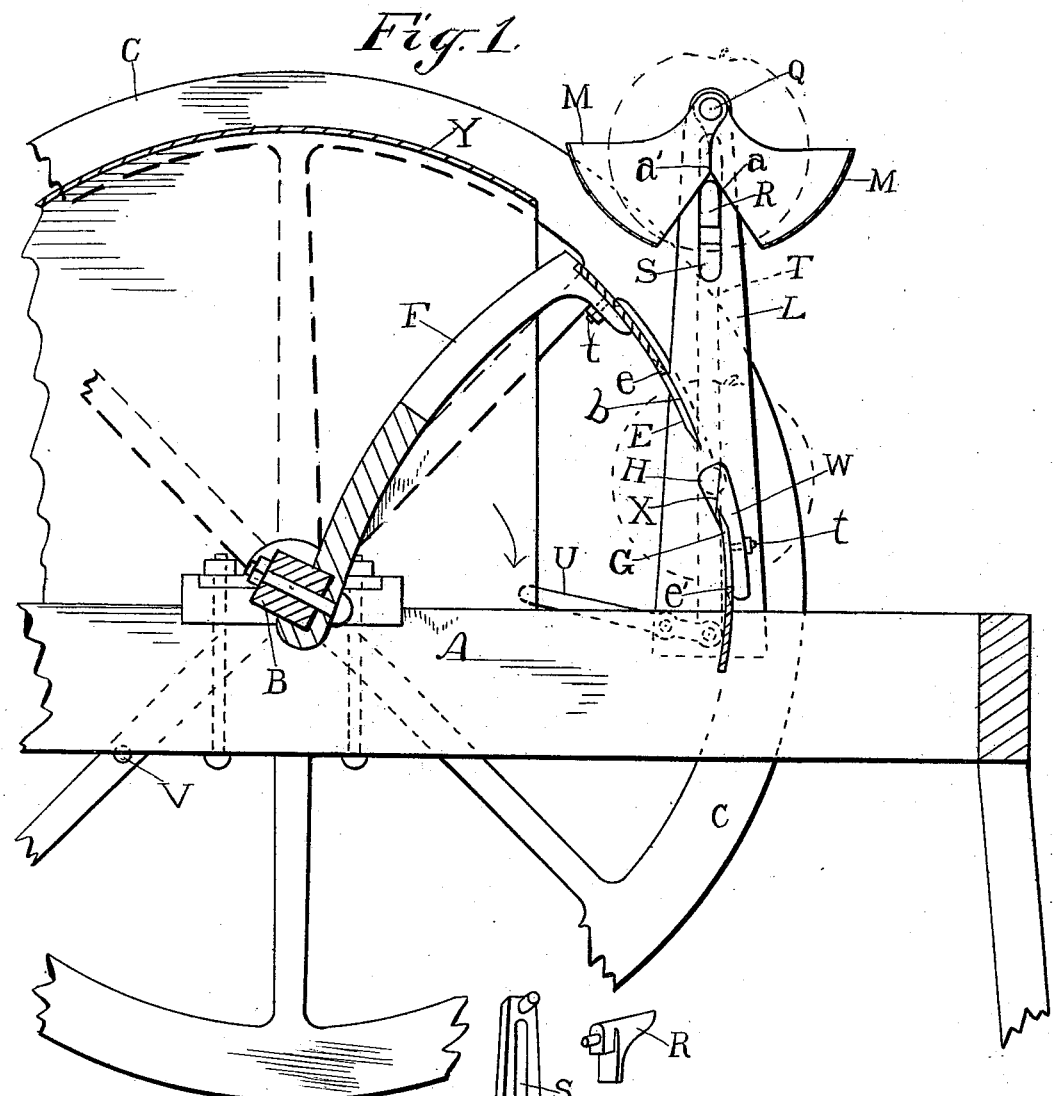
Witnesses.
Alfred D. Townsend
M. C. Galer
Inventor.
Jacob Harps
by Hazard Townsend
his Atty.

(No Model.) 3 Sheets—Sheet 2.

J. HARPS.
FRUIT PITTING MACHINE.

No. 464,128. Patented Dec. 1, 1891.

Witnesses.
Alfred J. Townsend
M. C. Galer.

Inventor.
Jacob Harps
By Hazard & Townsend
his Attys.

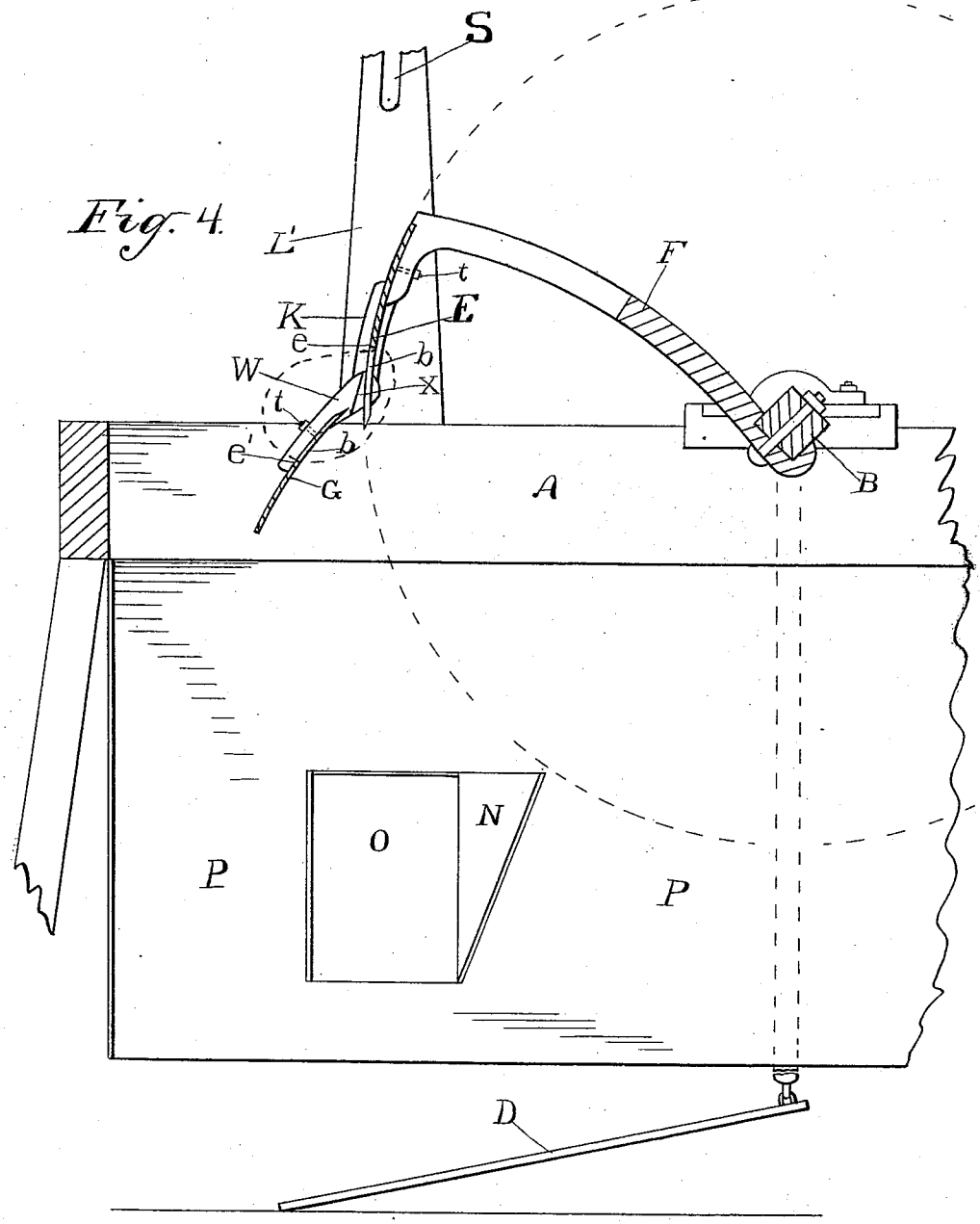

UNITED STATES PATENT OFFICE.

JACOB HARPS, OF SAN FERNANDO, CALIFORNIA.

FRUIT-PITTING MACHINE.

SPECIFICATION forming part of Letters Patent No. 464,128, dated December 1, 1891.

Application filed October 10, 1890. Serial No. 367,702. (No model.)

*To all whom it may concern:*

Be it known that I, JACOB HARPS, a citizen of the United States, residing at San Fernando, in the county of Los Angeles and State of California, have invented a new and useful Fruit-Pitting Machine, of which the following is a specification.

The object of my invention is to provide means for the rapid removal of pits or stones from free-stone peaches and other fruit of similar character, at the same time cutting the fruit in halves without bruising or injuring the pulp.

My invention differs essentially from the machines of this class heretofore made, in that my improved fruit-pitter operates with two knives, which cut the fruit on opposite sides, and with a twisting or prying motion separates the halves from the stone and deposits the stone and the pulp of the fruit in separate places.

My improved pitter is to be distinguished from that class of pitters in which the cutting-knives are arranged with their edges in line with the plane of rotation, for with knives thus arranged the fruit is more liable to be bruised than when the halves are pried apart by the action of the knives arranged transverse to the plane of rotation.

My invention embraces a fruit-pitting machine comprising the combination of a rotating pitting-knife having its edge arranged transverse to its plane of rotation and a yielding pitting-knife arranged with its edge uppermost normally close to the path of the edge of the rotating pitting-knife and transverse to the plane of rotation of the rotating pitting-knife. Such yielding knife is preferably a swinging knife having its path transverse to its edge and spring-supported, so that it will yield to the pressure of the pit without any jar and without danger of crushing the pit.

My invention also comprises means for feeding the fruit to the machine; and such means consist, essentially, of the combination of two swinging baskets hung with their upper edges apart to receive the fruit and with their lower edges juxtaposited, and operative means arranged for swinging such baskets so as to spread the juxtaposited edges apart, thus allowing the fruit placed in the basket to drop suddenly.

The accompanying drawings illustrate my invention.

Figure 1 is a vertical mid-section on line $x$ $x$, Fig. 3, portions of the machine being broken away to contract the view. Fig. 2 is a detail drawing showing several of the parts relating to the feed and to the yielding pitting-knife. Fig. 3 is a plain front elevation of the main part of the machine, the front of the frame being broken away for convenience of illustration. Fig. 4 is a side view taken from the side opposite that from which Fig. 1 is seen, portions of the machine being broken away for convenience of illustration, and the knives being shown in vertical mid-section on line $x$ $x$, Fig. 3. In this view the knives are shown in the position they assume when separating the pit from the pulp.

A is the frame, on which is journaled a shaft B, having a fly-wheel C, and driven by a treadle D or other suitable mechanism.

E is the rotating pitting-knife secured to the rotating knife-arm F, which is secured to the shaft B.

G is the yielding pitting-knife secured by suitable means to pivots H, which are arranged above the plane of the edge of the knife and are journaled in spring-supported slide-blocks I, which, with their supporting-springs J, are respectively mounted in slide-grooves K, which are arranged substantially tangential to the path of the rotating knife G in posts or standards L, from the top of which are suspended the swinging feed-baskets M. Each knife is provided with the pit-receiving recess $b$ and the pit-engaging lug $e$ $e'$. The swinging pitting-knife G is hung with its edge below the plane of pivots H, which sustain it, and normally close to the path of the edge of the rotating knife E.

In operation the peach or other fruit is fixed upon the knife by some suitable feed device, such as hereinafter described, and the rotating knife makes the upper half of the cut which is to sever the fruit into halves, and as the knife descends the pit-lug $e$ strikes the pit. In the meantime the pressure of the edge of the knife E and pit-lug $e$ has forced the peach down upon the swinging knife G until the pit of the fruit engages the pit-lug e'. The farther advance of the rotating knife presses upon the peach-stone, which forces the swinging knife G downward and the pivot-supporting slides I to swing forward, thus allowing the rotating knife to pass on downward while the stone falls into the pit-hopper N and out of the machine through the hole O. The two halves of the peach fall into the chute P, which conducts them out of the machine. The knives are fixed in place by bolts $t$, and may be removed to be ground; also to allow knives having different-sized recesses $b$ to be used to accommodate different-sized fruits.

The feeding device shown consists of two swinging baskets M M, pivoted together and to the grooved standards or posts L L' by pivots Q, from which the baskets depend. A dumping-lug R is mounted in a slot S in the post L and arranged to slide up and down therein, and projects between the baskets on one side thereof and engages the contiguous juxtaposited edges $a a'$ of such baskets, which have their common pivotal axis horizontally arranged above the edge of the pitting-knife in a vertical plane, passing through such edge when the knife is in its normal position. The dumping-lug is connected by a pitman T with a pivoted trip-lever U, one end of which extends into the path of a trip-lug V, projecting from the balance-wheel C. The dumping-lug when moved upward by the pitman operates to throw the baskets apart to drop the fruit, as hereinafter explained.

Each of the hangers or brackets W, by which the swinging knife is sustained, is provided with a beveled engaging face X, projecting slightly beyond the inner face of the swinging knife, and against which face X the extreme sides of the edge of the rotating knife E will strike if the swinging knife G should swing in too far when the rotating knife is descending. When the rotating knife strikes such face, the swinging knife is thereby forced to swing forward out of the path of the rotating knife.

Fig. 4 shows the two knives in the position they occupy at the moment the pit is being separated from the fruit. On the farther downward movement of the rotating knife the pit is released and falls into the hopper and out of the machine through the hole O, and the springs J return the knife G to its normal elevated position. (Shown in Fig. 3.)

The trip-pin V is preferably placed at such a point on the balance-wheel as to be opposite the rotating knife, so that the feed mechanism operates when the rotating knife is withdrawn from the swinging knife.

To operate the machine shown in the drawings, the treadle is driven to rotate the shaft B, fly-wheel C, and rotating knife E, and the fruit is placed in the swinging baskets M. As the wheel rotates, the lug V engages the free end of lever U and forces it down, thereby forcing up the other end, and the pitman T, which forces the dumping-lug R up, which in turn forces the swinging baskets M to swing apart, thus suddenly releasing the fruit which falls upon the edge of the swinging knife, which enters the pulp of the fruit and holds the fruit in position until the rotating knife reaches it and cuts and pits it. When the rotating knife strikes the pit, the swinging knife swings outward, thus producing the prying motion which separates the halves from the pit. As soon as the fruit drops off and the pit is discharged from the swinging knife, the action of the springs J and the weight of the knife bring such knife back into the original position shown in Fig. 1. The upper or side cutting-edges of the knife are nearly in line with the axis of the pivots H, which sustain the knife, so that, though the lower portion of such edge, including the pit-lug $e$, swings sufficiently to discharge the pit or stone and pry the halves apart, the upper side edges always remain in the path of the falling fruit, so that the fruit dropped by the baskets M sticks thereupon and does not fall through the machine.

Y is a cover to shield the rotating knife.

Now, having described my invention, what I claim as new, and desire to secure by Letters Patent, is—

1. A fruit-pitting machine comprising the combination of a rotating pitting-knife having its edge transverse to its plane of rotation and a yielding pitting-knife arranged with its edge uppermost normally close to the path of the edge of the rotating pitting-knife and transverse to the plane of rotation of such rotating pitting-knife.

2. A fruit-pitting machine comprising the combination of a rotating pitting-knife having its edge transverse to its plane of rotation and a swinging pitting-knife arranged with its edge normally close to the path of the rotating pitting-knife and transverse to the plane of rotation of such rotating pitting-knife and having its path transverse to its edge.

3. The combination of the shaft, the arm secured to the shaft, the rotating pitting-knife secured to the arm transverse to the plane of rotation, the swinging transverse pitting-knife secured to pivots arranged above the plane of the edge of the knife, the slide-blocks, the grooved standards, and the springs.

4. The combination of the rotating pitting-knife, the swinging pitting-knife secured to pivots arranged above the plane of the edge of the knife, the slide-blocks, and the standards provided with the grooves K, arranged tangential to the path of the rotating knife.

5. In a fruit-pitting machine, the feeding device comprising the combination of two swinging baskets hung with their upper edges apart to receive the fruit and with their lower edges juxtaposited, and means for swinging such baskets.

6. The combination of the pitting-knife arranged with its edge uppermost, the two swinging baskets hung above such knife with their lower edges juxtaposed and with their pivotal axis horizontally arranged above the edge of the knife in a vertical plane passing through such edge when the knife is in its normal position, and means for swinging such baskets.

7. The combination of the shaft, the rotating knife secured thereto, the fly-wheel secured to the shaft, the trip-lug projecting from such fly-wheel, the yielding knife arranged with its edge uppermost, the swinging feed-baskets arranged above such knife with their lower edges juxtaposed, the dumping-lug arranged to move up and down and engage the juxtaposited edges of such baskets, the pivoted trip-lever, one end of which extends into the path of the trip-lug, and the pitman connecting the dumping-lug with the trip-lever.

JACOB HARPS.

Witnesses:
JAMES R. TOWNSEND,
ALFRED I. TOWNSEND.